United States Patent Office 3,432,767
Patented Mar. 11, 1969

3,432,767
APPARATUS EMPLOYING ELECTRONIC LIGHT SHUTTERS FOR SWITCHING THE DIRECTION OF A LASER BEAM ALONG DISCRETE PATHS
Robert V. Pole, Yorktown Heights, and Jaen Nuñez, Flushing, N.Y., assignors to International Business Machines Corporation, New York, N.Y., a corporation of New York
Filed June 26, 1964, Ser. No. 378,220
U.S. Cl. 331—94.5
Int. Cl. H01s 3/00
8 Claims

ABSTRACT OF THE DISCLOSURE

A multipath laser apparatus is provided including an active laser element, one end of which is formed into a plurality of plane surfaces each having a reflective coating thereon. The opposite end of the active laser element includes a number of plane surfaces each one being parallel to a different one of the coated surfaces thereby forming a number of discrete paths perpendicular to the parallel surfaces. Adjacent to the uncoated end of the active laser element are provided a number of mirrors arranged such that each one is perpendicular to a different one of the paths, thereby forming a plurality of discrete resonant cavities. Electronic light shutters are placed in each path between the active laser element and each mirror. A light polarizer is placed in each path between the light shutter and the active element. When voltage is is applied to a given Kerr cell, the amount of feedback in the associated path, that is, the Q of the resonant cavity along the path is reduced with respect to the Q of the cavities wherein the light shutter is not energized. When the laser element is then triggered into emission of intense laser light, the beam direction follows the preferred path having the higher relative Q.

---

Figure 1:
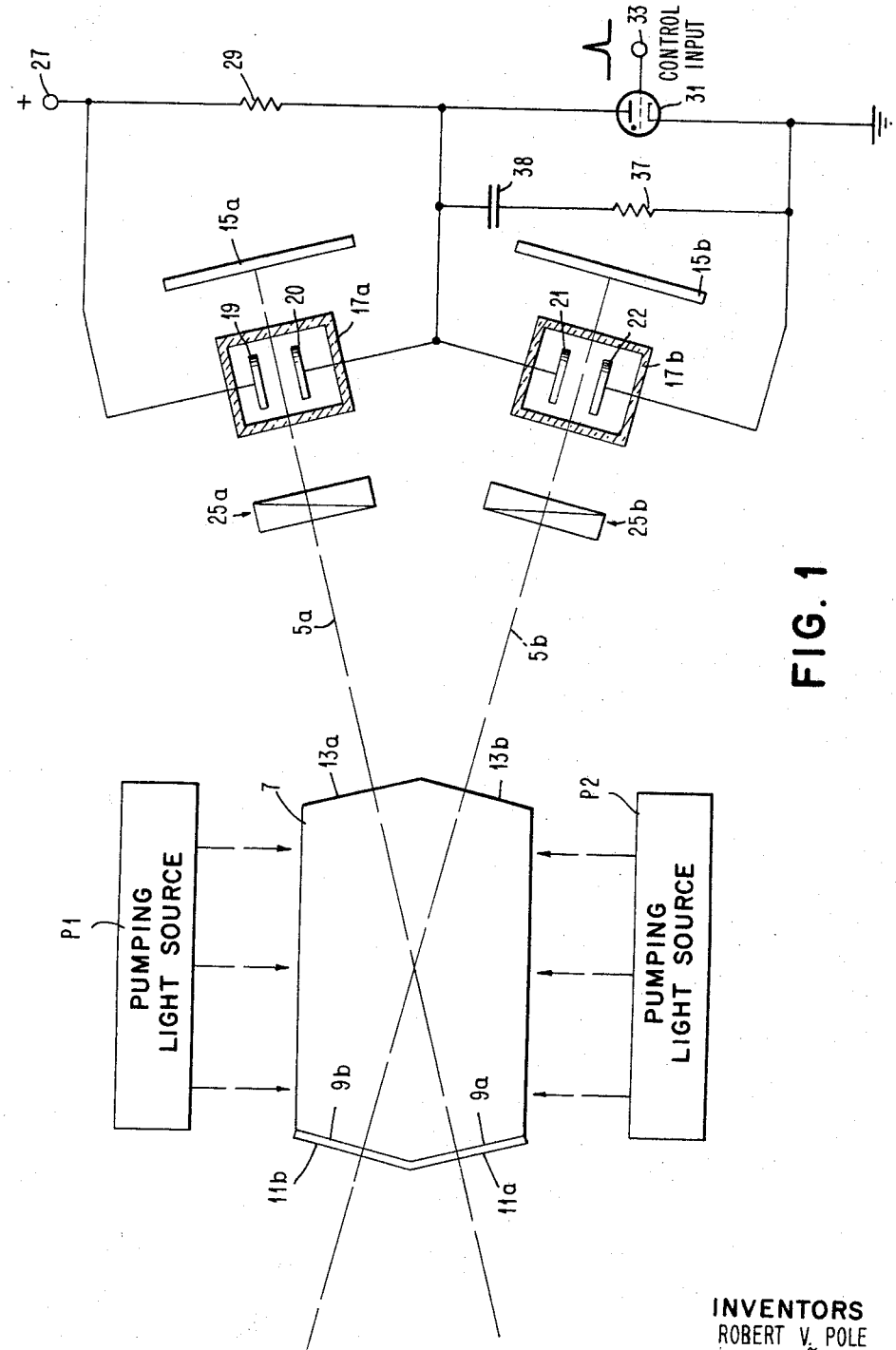

There are many devices capable of changing the direction of a beam of laser light. For example, adjustable mirrors can deflect the beam along various paths, or the entire laser can be rotated to a new direction. However, most of these schemes are relatively slow due to the inertia of the moving parts.

Another method of altering the direction of a laser beam is to pass it through certain types of birefringent crystals controlled by electrical signals. While this method provides a relatively fast change in direction, the angular swing is small and the beam loses some of the natural high directivity associated with laser light.

Satisfactory solutions to the above problems are shown in commonly assigned, copending application Ser. No. 332,617, entitled "Scanning Laser," by Robert V. Pole, and commonly assigned, application Ser. No. 377,957, filed concurrently herewith and entitled, "Laser Beam Switching," by Euval S. Barrekette, Robert A. Myers, Jaen Nunez, and Robert V. Pole. In the former application two concentric mirrors are located about a laser element so that a resonant cavity is formed. The laser beam is caused to scan across one of the concentric mirrors by adjusting the position of maximum reflectivity within the cavity. The present invention is directed to a modification of the copending application of Robert V. Pole which permits the laser beam to be switched between a number of discrete paths.

The present invention differs from the concurrently filed application by Euval S. Barrekette et al., wherein the laser element is shaped in the form of a lens and one mirror is placed in the focal surface of the laser lens.

It is an object of the present invention to provide apparatus for switching the direction of a laser beam along discrete paths.

Another object of the present invention is to provide apparatus capable of switching laser beams rapidly, with a wide angular deflection and a highly directional beam path.

A further object of the present invention is to provide laser beam switching apparatus capable of easy construction and responsive to a minimum amount of control power.

These and other objects of the present invention are accomplished by providing an active laser and a number of reflecting surfaces located about the laser. The locations of the surfaces are selected so that a plurality of discrete paths are established through the laser having reflecting surfaces located at each end thereof and arranged perpendicular to the direction of the path. In this manner light is reflected back and forth between the surfaces at opposite ends of each path forming a plurality of discrete resonant cavities.

Electronic light shutters are placed in each of the paths to diminish the intensity of the light reflected along selected ones of the paths. The laser emits light along the path having the lowest loss (highest quality factor Q).

By using various well-known electronic light shutters the laser beam can be switched from one path to another at very high speeds with only small control power. Another advantage of the present invention is the preservation of the natural high directivity of the laser beam which is deflected internally at the point of creation rather than by external deflectng means such as a birefringent crystal.

Still another advantage of the present invention is the unlimited angular deflection attainable due to the ability of the laser element to emit along any path.

In accordance with another aspect of the present invention one end of the laser element is formed into a plurality of plane surfaces having a reflective coating thereon. The opposite end of the laser includes a number of plane surfaces each one being parallel to a different one of the coated surfaces thereby forming a number of discrete paths perpendicular to the parallel surfaces. Adjacent to the uncoated end of the laser element are a number of mirrors are arranged each one perpendicular to a different one of the paths thereby forming a plurality of discrete resonant cavities. The electronic light shutters are placed in each path between the laser and mirror. Construction of the laser beam switching apparatus in this manner is relatively simple since no curved mirrors or surfaces are necessary and the laser beam follows a simple straight line path.

The foregoing and other objects, features and advantages of the invention will be apparent from the following more particular description of preferred embodiments of the invention, as illustrated in the accompanying drawings.

Figure 2:
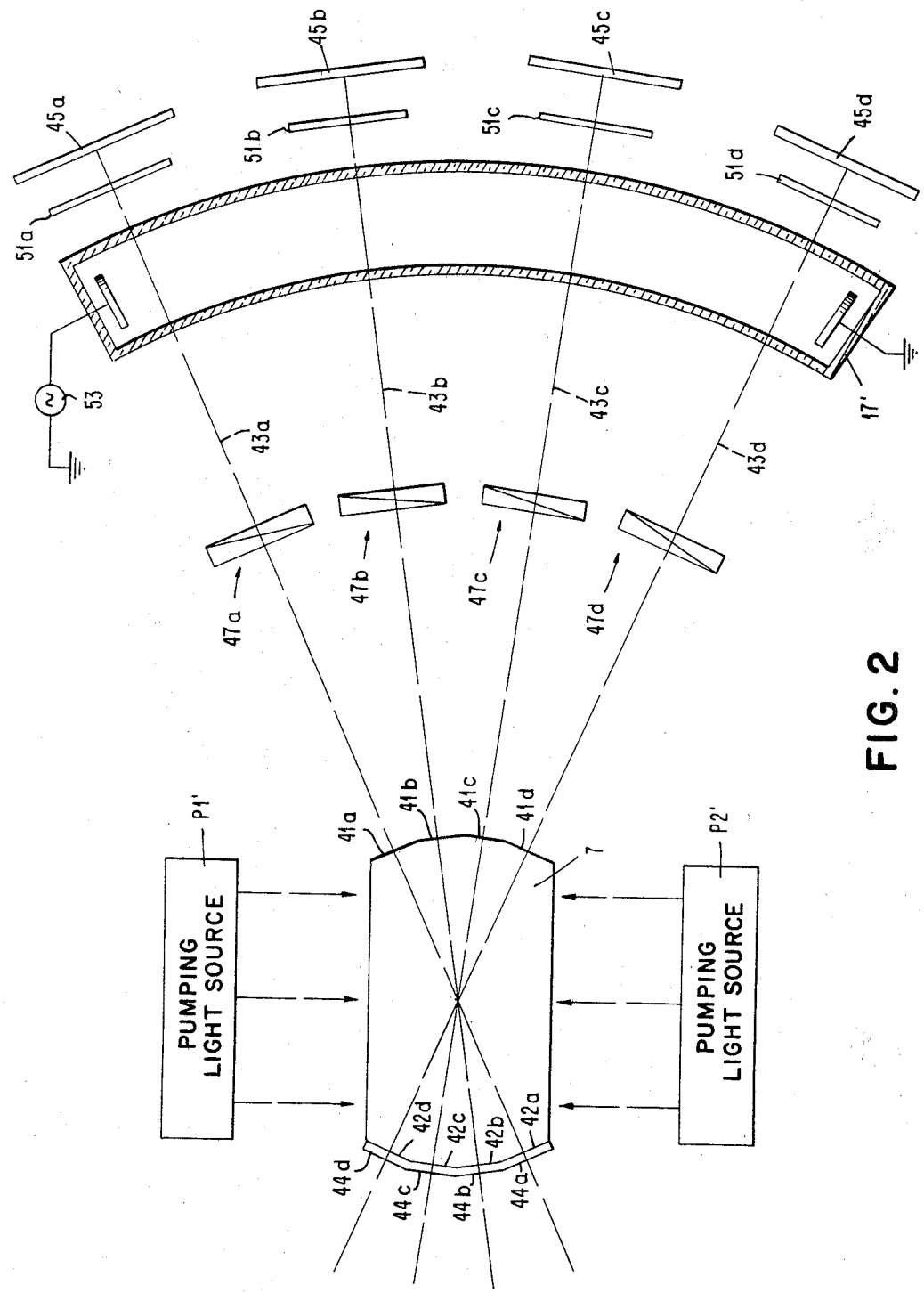

In the drawings:

FIG. 1 is a diagram of the present invention for switching the laser beam between two paths; and FIG. 2 is a diagram illustrating another embodiment of the present invention for switching the laser beam between four paths and illustrating another form of optical shutter, claimed in the above concurrently filed application by Euval S. Barrekette, capable of use with the present invention.

The apparatus shown in FIG. 1 is capable of switching a laser beam between two paths 5a and 5b which extend through a laser element 7. The useful laser light may be taken from the left end of the element 7 where it may be utilized in communications, computers, visual displays, optical scanning or other systems requiring a very high energy beam of coherent light.

On the left end of the laser element 7 which has a cylindrical cross section, two plane surfaces 9a and 9b are formed having reflective coatings 11a and 11b formed thereon. On the opposite side of the laser element 7 two additional surfaces 13a and 13b are formed so that surface 13a is parallel to surface 9a and surface 13b is parallel to surface 9b. Two mirrors 15a and 15b are placed perpendicular to the paths 5a and 5b, respectively, as shown in FIG. 1.

The laser element 7 is powered by pumping light sources P1 and P2. While the sources are shown as separate devices, there may be a single helical flash tube wrapped about the laser element 7. The sources P1 and P2 pump energy into the laser by inverting the population of its energy levels in a well-known manner. A resonant cavity is formed along each of the paths 5a and 5b. If the light along paths 5a and 5b is unobstructed, the laser will oscillate and emit high energy laser beams in both directions simultaneously.

The laser element 7 can be forced to emit a high energy laser beam along only one of the paths 5a or 5b if the Q of one of the cavities is decreased by inserting suitable light shutters in series with the paths 5. The light shutters shown in FIG. 1 consist of two nitrobenzene Kerr cells 17a and 17b each having a pair of electrodes 19, 20 and 21, 22 respectively. Two polarizers 25a and 25b are placed in the paths 5a and 5b. The Kerr cells 17 and polarizers 25 operate in a conventional manner. For example, when a voltage is applied across the electrodes 19 and 20 of Kerr cell 17a, the two perpendicular components of the light vector of the plane polarized light beam emerging from polarizer 25a are propagated through the Kerr cell 17a with different velocities. Upon emergence from the cell they acquire a certain amount of relative phase difference so that the emergent light is elliptically polarized. The amount of the relative phase delay and consequently the amount of ellipticity is proportional to the square of the applied voltage applied to the electrodes 19–22.

The polarizers 25a and 25b are oriented with their axis at 45° with respect to the direction of the electric field in the associated Kerr cells 17a and 17b. In this manner the light vector emerging from the polarizers 25a and 25b include two components. One is parallel and the other is perpendicular to the electric field of the associated Kerr cells 17, and each component is equal in magnitude.

Referring to FIG. 1 the light emerging from the laser element 7 is first plane polarized by the polarizers 25a and 25b. After passing through the Kerr cells 17a and 17b it acquires a certain amount of ellipticity which amount is a function of the voltage applied to each of the Kerr cells. Upon reflection from the external mirrors 15a and 15b the light passes through the Kerr cells 17 again where its ellipticity is doubled. When the elliptically polarized light passes back through the polarizer, the latter acts as an analyser passing only that component of the elliptically polarized light which is parallel to the axis of the polarizer. The magnitude of this component is smaller than the magnitude of the original plane polarized light and is a cosine square function of the double phase delay introduced by the Kerr cell.

When no voltage is applied to the Kerr cell, the phase delay is zero and the amount of light returning through the analyser back into the laser element 7 is unchanged (apart from negligible absorption). If the round trip phase delay amounts to a half wavelength of the lasing light the amount of light returning to the laser 7 is zero. For all intermediate phase delay the amount of light returning to the laser 7 follows the aforementioned cosine square function.

Circuitry is provided in FIG. 1 for controlling the voltage applied to terminals 19–22. A high voltage supply is connected to a terminal 27 and is applied across a series connected resistor 29 and thyratron tube 31. Electrodes 19 and 20 are connected across resistor 29, and electrodes 21 and 22 are connected across tube 31. Conduction of current through tube 31 is initiated by pulses supplied to an input terminal 33.

In operation when tube 31 conducts electrodes 21 and 22 have effectively no voltage applied thereto. All the voltage drop occurs across resistor 29 and is applied to terminals 19 and 20. A biasing network including resistor 37 and capacitor 38 cuts off tube 31 shortly after the control pulse is applied. The time of cut off is determined by the time constant of the resistor 37 and capacitor 38. When the tube 31 cuts off, conduction through resistor 29 terminates and the voltage across electrodes 19 and 20 drops to zero. At this time the voltage applied to terminal 27 appears across electrodes 21 and 22. In this manner Kerr cells 17a and 17b can be alternately operated in response to signals applied to terminal 33.

By having the high voltage across the Kerr cell 17a, for example, the amount of light returning from the mirror 15a to laser 7, i.e., the amount of feedback reaching laser 7, is reduced. Accordingly, the quality factor Q, of the resonant cavity along path 5a is reduced with respect to the Q along path 5b. Therefore when the laser element 7 is triggered into emission of intense laser light, the beam direction follows the preferred path 5b. The beam may be switched rapidly to path 5a by causing tube 31 to conduct.

The following table lists the dimensions and values of parameters of the apparatus shown in FIG. 1 found to be suitable for successful operation:

| | |
|---|---|
| Laser 7 material | Ruby crystal. |
| Angle between paths 5a and 5b | 17.5°. |
| Geometry of ruby laser 7 | Cylindrical, 1¼ inch length and ⅜ inch diameter. |
| Distance between coatings 11 and mirrors 15 | 60 cm. |
| Parallel alignment of coatings 11 and mirrors 15 | Tolerance of 1 second of arc. |
| Pumping light source P1 and P2 energy | From 0 to 50% above threshold of ruby laser 7. |
| Maximum needed phase delay | ⅙ of lasing wavelength. |

While the above values have been found to be suitable, various modifications can be made. For example, the polarizers 25 may be eliminated where the laser light has a natural polarized emission. In this case the optic axes of the laser 7 may be oriented 45° with respect to the plane of FIG. 1 and the polarizers 25 may be eliminated.

The principle of the present invention can be extended from the two path configuration illustrated in FIG. 1 to any number of paths. A four path configuration is illustrated in FIG. 2. The laser element 7' includes four pairs of parallel surfaces 41a–d 42a–d accommodating paths 43a–d, like letter designations being applied to associated surfaces and paths. Coatings 44a–d are applied to surfaces 42a–d respectively. Four mirrors 45a–d are located parallel to coatings 44a–d respectively.

In a manner similar to that described with regard to FIG. 1 resonant cavities are established along paths 43a–d in response to light from laser 7' stimulated by pumping sources P1' and P2'. A particular one of the paths 43a–d is selected for emission of the high intensity laser beam by reducing, or spoiling, the Q of all but one of the resonant cavities established along paths 43a–d. To accomplish this another form of Q control is employed in FIG. 2 including a Kerr cell 17' common to all paths and a group of polarizers 47a–d which operate in the same manner as described in connection with FIG. 1. However, four compensators 51a–d are inserted in paths 43a–d, respectively. Each compensator 51a–d introduces a different amount of phase delay to the light passing therethrough. The difference between the phase delay introduced by the four compensators 51a–d shown in FIG. 2 may be ⅛ of the lasing wavelength of the element 7'.

In operation if the Kerr cell 17' introduces a phase delay in the path 43a which is exactly compensated for by compensator 51a, light is reflected back through polarizer 47a. The remaining compensators 51b–d, which provide a different amount of compensation fail to fully compensate for the delay of the Kerr cell 17'. Consequently the Q in all other paths will be lower than the Q in the paths 43, and the system will lose only along path 43a.

Other phase delays introduced by Kerr cell 17' will be compensated by different compensators. The path selected is a function of the applied voltage. As shown in FIG. 2 a sinusoidal source 53 applies a varying signal to Kerr cell 17' causing compensators 51a–d to sequentially match the rotation introduced by Kerr cell 17'. During a complete cycle of the sinusoidal source 53 the beam is switched from path 43a to path 43d and back again to path 43a. The laser beam is switched rapidly from one path to another in response to only a small amount of control power provided by source 53.

Another advantage is apparent from the geometry of the laser element 7. The deflection of the beam can be exceedingly wide since the laser is capable of emitting high intensity pulses along any resonant path. Further there are no moving parts or other inertia involved in switching the beam path. Additionally, the natural high resolution of the laser beam is preserved as it pierces through coatings 11 in response to the triggering of laser 7.

In the embodiments shown in FIGS. 1 and 2 the beams described are in the light frequency range. However, stimulated emission of other frequency ranges, for example microwave, may be switched in accordance with the present invention.

Another modification may be made to the present invention by removing the reflective coatings 11a and 11b and substituting a pair of mirrors on the same side of the laser 7 arranged perpendicular to the paths 5a and 5b. Further, the paths 5 need not enter and leave the laser 7 perpendicular to the surfaces 11 and 13 provided the mirrors are always perpendicular to the direction of the path. In still another modification, the surfaces 11a and 13a need not be parallel to each other so long as the mirrors are perpendicular to the path. In this case the mirrors would not be parallel to one another.

It is apparent that there are many techniques of positioning the mirrors 15 or reflective coatings 11 to establish resonant cavities through the laser 7. While the invention has been particularly shown and described with reference to preferred embodiments thereof, it will be understood by those skilled in the art that the foregoing and the other changes in form and details may be made therein without departing from the spirit and scope of the invention.

What is claimed is:

1. Apparatus for switching the direction of a laser beam between a plurality of discrete paths, comprising:
   a laser element having a plurality of plane surfaces each one accommodating a different one of said paths;
   a plurality of plane reflecting surfaces arranged about said laser element so that each path has located at each end thereof one of said reflecting surfaces positioned perpendicular to the direction of the path whereby a resonant cavity is formed along each of said paths; and
   control means located in each of said paths and operable selectively for diminishing the intensity of light along selected ones of said paths thereby establishing at least one preferred path having a higher quality factor Q for creating emission of a laser beam along said preferred path.

2. Apparatus as defined in claim 1 wherein one plane reflecting surface associated with each path is a reflective coating on one of the plane surfaces of said laser element.

3. Apparatus for switching the direction of a laser beam between a plurality of discrete paths, comprising:
   a laser element having a plurality of pairs of plane parallel surfaces, each pair of surfaces accommodating a different one of said paths;
   a plurality of plane reflecting surfaces arranged about said laser element so that each path has located at each end thereof one of said reflective surfaces positioned perpendicular to the direction of the path whereby a resonant cavity is formed along each of said paths; and
   control means located in each of said paths and operable selectively for diminishing the intensity of light along selected ones of said paths thereby establishing at least one preferred path having a higher quality factor Q for creating emission of a laser beam along said preferred path.

4. Apparatus as defined in claim 3 wherein one plane reflecting surface associated with each path is a reflective coating on one of the plane surfaces of said laser element.

5. Apparatus for switching the direction of a laser beam between a plurality of discrete paths, comprising:
   a laser element having a plurality of pairs of plane parallel surfaces, each pair of surfaces accommodating a different one of said paths;
   a plurality of pairs of plane parallel reflecting surfaces arranged about said laser element so that each path has located at each end thereof one of said reflecting surfaces positioned perpendicular to the direction of the path whereby a resonant cavity is formed along each of said paths; and
   control means located in each of said paths and operable selectively for diminishing the intensity of light along selected ones of said paths thereby establishing at least one preferred path having a higher quality factor Q for creating emission of a laser beam along said preferred path.

6. Apparatus as defined in claim 5 wherein each of said pairs of reflecting surfaces and laser surfaces associated with the same path are parallel to one another.

7. Apparatus as defined in claim 5 wherein one member of each pair of reflecting surfaces is a reflective coating on the associated surface of said laser element.

8. Apparatus for switching the direction of a laser beam between two discrete paths, comprising:
   a laser element formed symmetrically about a longitudinal plane and having a first and a second end portion each including two plane surfaces intersecting at said longitudinal plane, the angle of intersection being selected to place each surface parallel to and in line with a different one of the surfaces at the opposite end of said laser;
   a reflective coating applied to the surfaces of said first end;
   a pair of mirrors each one located parallel to a different one of the surfaces of said second end to form two resonant cavities; and
   control means located between said second end and each of said mirrors and operable alternately for diminishing the intensity of light passing between said mirrors and laser thereby selectively establishing a preferred path having a higher quality factor Q for creating emission of a laser beam along said preferred path.

(References on following page)

References Cited

UNITED STATES PATENTS

| | | | |
|---|---|---|---|
| 3,177,446 | 3/1965 | Hoadley et al. | 331—94.5 |
| 3,339,151 | 8/1967 | Smith | 331—94.5 |
| 3,344,365 | 9/1967 | Lewis | 331—94.5 |
| 3,293,565 | 12/1966 | Hardy | 331—94.5 |

OTHER REFERENCES

McClung et al.: Research Rep. #213, Hughes Res. Labs., Malibu, Calif., September 1961.

JEWELL H. PEDERSON, *Primary Examiner.*

E. BAUER, *Assistant Examiner.*